Jan. 26, 1937.　　　T. F. LEAHEY　　　2,069,094
DEVICE FOR OPENING SHELL FISH
Filed March 11, 1936　　　2 Sheets-Sheet 1
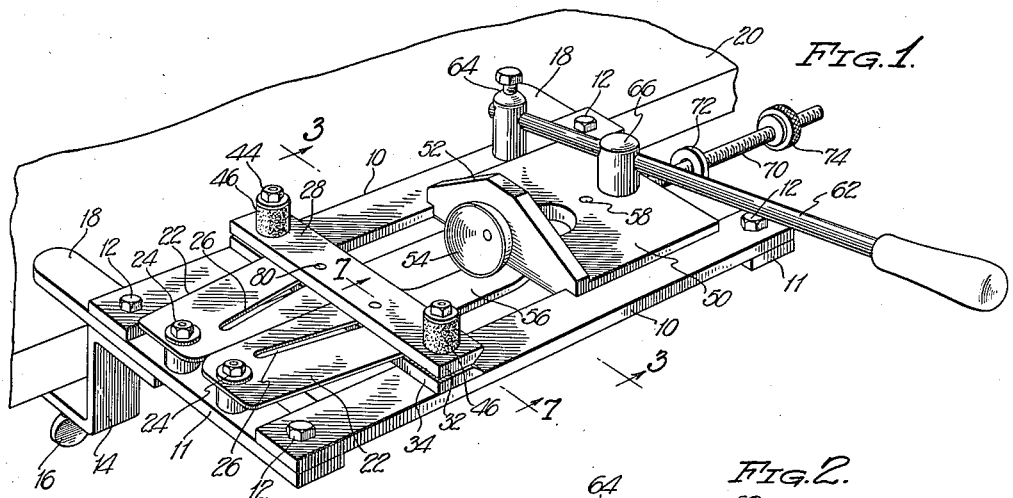
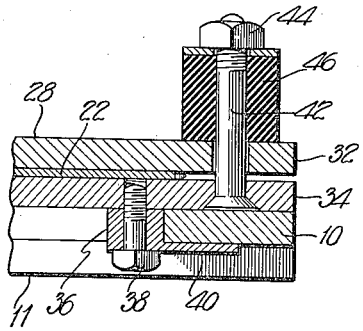
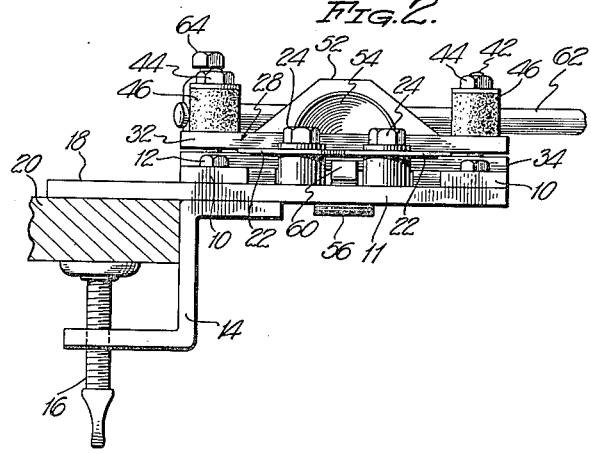
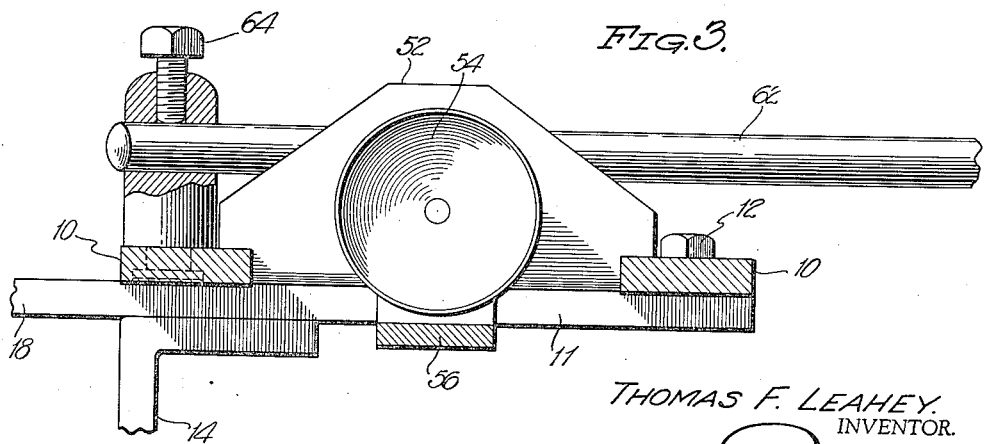
THOMAS F. LEAHEY,
INVENTOR.
BY Ely Pattison,
ATTORNEYS.

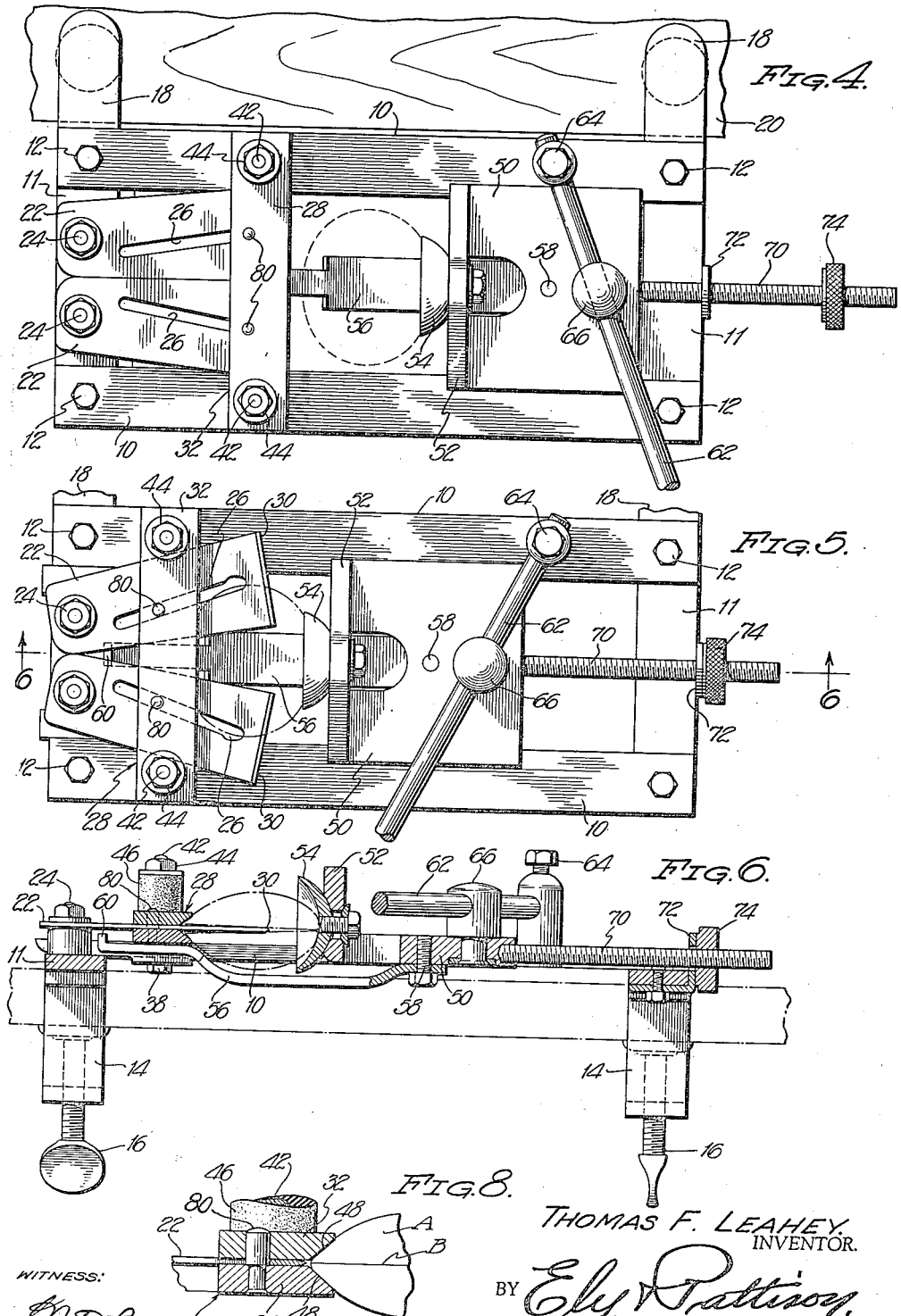

Patented Jan. 26, 1937

2,069,094

UNITED STATES PATENT OFFICE 2,069,094

DEVICE FOR OPENING SHELL FISH

Thomas F. Leahey, Poughkeepsie, N. Y.

Application March 11, 1936, Serial No. 68,156

14 Claims. (Cl. 17—9)

This invention relates to a new and improved device for splitting or opening shell fish and similar articles, and while the invention is herein illustrated as embodied in an apparatus for opening clams, such use is merely explanatory and certain principles and constructions of the invention may be embodied in apparatus for opening oysters or nuts wherein there may be two substantially half shell sections divided by a joint between the sections.

It is the primary object of the invention to provide a device by which clams or similar articles may be readily opened in an easy manner without danger of injury to the operator.

A further object of the invention resides in the provision of a novel device of the type described which greatly facilitates the opening operation and renders it more rapid of accomplishment.

A further object of the invention resides in the provision of a device, the operation of which is extremely simple and requires no skill upon the part of the operator.

Still a further object of the invention resides in a novel construction whereby the opening operation is accomplished by the single stroke of a manually operated lever.

Other objects and advantages will be apparent as the nature of the invention is better understood, and reference will therefore be had to the following specification and claims and the accompanying drawings, in which:

Figure 1 is a perspective view illustrating a device constructed in accordance with the present invention, Figure 2 is an end elevation thereof, Figure 3 is a transverse sectional view taken substantially on the line 3—3 of Figure 1, Figure 4 is a top plan view illustrating the parts in one of their operating positions, Figure 5 is a similar view illustrating the parts in another of their operating positions, Figure 6 is a longitudinal sectional view taken substantially on the line 6—6 of Figure 5, Figure 7 is a fragmentary transverse sectional view taken substantially on the line 7—7 of Figure 1, and;

Figure 8 is a detail sectional view.

The device consists of a base which comprises a rectangular frame-like member. The base includes side members 10 connected by end members 11, the parts being connected together by suitable fastening means 12, herein illustrated as bolts which pass through the members 10 and 11 where they cross one another. Carried by the end members 11 there are members 14 which carry thumb screws 16, and these members cooperating with extensions 18 of the end members provide means for attaching the device to the edge of a table, bench, or other suitable support.

At one end there are two splitting knives 22. These splitting knives 22 are pivotally mounted to their adjacent end member as at 24, and are so arranged that they swing about their pivotal points in a horizontal plane. These splitting knives are each provided with an angularly disposed slot 26, the purpose of which will be hereinafter described. The reference numeral 28 designates a guide for positioning a clam to be opened with the joint between the half sections of its shell in alinement with the forward edges 30 of the splitting knives 22, as best illustrated in Figure 8. This guide comprises two members 32 and 34, of which the member 32 is the upper member. These two members, as best illustrated in Figure 7, embrace the splitting knives 22 and are mounted for sliding movement therealong. At each end of the guide there is a member 36 secured to the lower member 34 of the guide by a suitable fastening 38, which member has an extension 40 adapted to underlie its respective side member 10 to prevent raising of the guide during operation. Since the guide embraces the splitting knives, this construction also prevents raising or springing of the splitting knives out of their true horizontal plane. The two members 32 and 34 of the guide are secured in position about the splitting knives 22 by bolts 42, and interposed between the nuts 44 of the bolts 42 and the top member 32 of the guide there is a resilient cushion 46.

By this construction it will be obvious that the guide is capable of sliding movement along the splitting knives upon operation of the device, and that by reason of the forward edges of the members 32 and 34 of the guide being beveled as at 48, a clam or similar device, which is herein designated by the character A, when it is moved in engagement with the guide, will be positioned so that the joint between the half sections and its shell, and which is herein designated B, will be in direct alinement with the forward or operative edges of the splitting knives 22.

Means is provided for supporting and moving a clam to be operated upon into engagement with the guide 28 and the splitting knives 22, and in the present embodiment of the invention, this means comprises a member 50 slidably mounted upon the side members 10 of the base. This member preferably consists of a rectangular base portion from which a flange 52 extends vertically, and carried by said flange, there is a clam engaging foot 54. Extending forwardly of the clam engaging foot 54 and mounted beneath the same, there is a relatively narrow bar 56 upon which the clam is supported during the opening operation. As best illustrated in Figure 6, this member 56 is secured by a bolt 58 to the under side of the member 50. Its intermediate portion is depressed, as illustrated, and its free end is provided with a hook 60, the several parts being so arranged that the hook 60 will engage the guide 28 to move the same under certain operating conditions.

The member 50 is moved along the base by means of an operating lever 62 which is pivotally mounted as at 64 to one of the side members of the base and which extends through and has sliding movement in a standard 66 projecting from the top face of the member 50. Thus, as the lever 62 is moved about its pivotal point 64, the member 50 will be reciprocated along the base depending upon the direction of movement imparted to said lever 62. Adjustable means is provided for limiting the movement of the member 50 in one direction, and this means consists of a screw threaded shaft 70, which passes through a suitable opening in a stop arm 72, which stop arm is engaged by a nut 74 adjustable along the threaded shaft 70. Thus, as the member 50 is moved to the left in the drawings, the threaded shaft 70 will move through the opening in the upstanding stop member 72 until the nut 74 engages said stop member, whereupon, further movement of the member 50 is arrested.

Means is provided to move the splitting knives laterally in a horizontal plane during the operation of opening a clam, and this means is herein illustrated as comprising pins 80 carried by the guide 28 and projecting into the angularly disposed slots 26 heretofore mentioned. By this construction it will be obvious that movement of the guide 28 along the splitting knives 22 will cause them to move in a lateral direction relative to the guide 28 and the clam being operated upon.

The device operates in the following manner. With the parts in the position in which they are shown in Figure 4, a clam is placed upon the support 56. With the clam in position, the lever 62 is grasped and moved to the left in said Figure 4. Movement of the lever to the left in said Figure 4 moves the parts to the position in which they are shown in Figure 5, and during this movement, the clam will move into engagement with the guide 28, as illustrated in Figure 8. Movement of the clam will then move the guide 28 along the splitting blades 22. The blades will then be projected from the forward edge of the guide and will enter the joint between the half shell section of the clam, it being understood that the beveled edges 48 of the members which form the guide will position the clam with this joint between its half shell sections in alinement with the splitting knives 22. As the clam is further moved to the left and the splitting knives open the shell, the half sections are prevented from opening to too great an extent by reason of the fact that they are embraced by the two members 32 and 34 which form the guide. It is to be understood that the nut 74 will be so adjusted that, as the clam is split, the nut will engage the upstanding stop 72 and arrest further movement of the member 50.

After the clam has been opened in the above described manner, the lever 62 is moved to the right in Figure 5 to return the member 50 to the position in which it is shown in Figure 4 and to disengage the clam from the splitting knives 22. Upon the return movement of the member 50, the hooked end 60 of the support 56 will engage behind the guide 28 and move the same to the right in the drawings to the position in which it is shown in Figure 4, in which position it masks the forward or operative edges of the splitting knives 22. The clam may then be removed and replaced by another clam to be operated upon.

From the foregoing it will be apparent that the present invention provides a device by which the operation of opening clams and similar shell fish may be expeditiously carried out without danger to the operator and in a sure and efficient manner without requiring any special skill on the part of the operator.

While the invention has been herein illustrated in its preferred form, it is to be understood that it is not to be limited to the specific construction herein shown and that it may be carried out in other forms without departing from the spirit thereof.

Having thus described the invention, what is claimed as new, is:

1. A device of the character described including a supporting base, a plurality of splitting knives mounted on said base, and means for moving an article to be split into engagement with said splitting knives.

2. A device of the character described, including a base, a pair of splitting knives carried by said base, means for moving an article to be split into engagement with said splitting knives, and means for moving said knives laterally while in engagement with the article being split thereby.

3. A device of the character described including a base, a plurality of splitting knives pivotally mounted on said base, means for moving an article to be split into engagement with the splitting knives to split said article, and means for rocking said splitting knives laterally about their pivotal points during the splitting operation.

4. A device of the character described including a base, a pair of splitting knives mounted upon said base, means for moving an article to be split into splitting engagement with the splitting knives, and means for effecting a predetermined positioning of the article to be split relatively to the splitting knives.

5. A device of the character described including a base, a pair of splitting knives mounted upon said base, means for supporting and moving an article to be split into engagement with said splitting knives to effect a splitting of said article, and means for moving said splitting knives relatively to the article being split during a splitting operation.

6. A device for opening clams or similar shell fish, comprising a base, splitting knives pivotally mounted upon the base for movement in a horizontal plane, means for supporting and moving a clam to be operated upon into splitting engagement with said splitting knives, and a guide for positioning a clam to be split with the joint between its shell sections in alinement with said splitting knives.

7. A device for opening clams or similar shell fish, comprising a base, splitting knives pivotally mounted upon the base for movement in a horizontal plane, means for supporting and moving a clam to be operated upon into splitting engagement with said splitting knives, and a guide for positioning a clam to be split with the joint between its shell sections in alinement with said splitting knives, said guide embracing said splitting knives and being movable therealong during a splitting operation.

8. A device for opening clams or similar shell fish, comprising a base, splitting knives pivotally mounted upon the base for movement in a horizontal plane, means for supporting and moving a clam to be operated upon into splitting engagement with said splitting knives, and a guide for positioning a clam to be split with the joint between its shell sections in alinement with said splitting knives, said guide embracing said splitting knives and being movable therealong by engagement of a clam therewith during the splitting operation.

9. A device for opening clams and similar shell fish comprising a base, splitting knives pivotally mounted upon the base for movement in a horizontal plane, means for supporting and moving a clam to be operated upon into splitting engagement with said splitting knives, and a guide for positioning a clam to be split with the joint between its shell sections in alinement with said splitting knives, said guide engaging the clam upon opposite sides of the joint between the shells to limit the spreading of said shell sections.

10. A device for opening clams and similar shell fish comprising a base, splitting knives mounted upon the base for movement in a horizontal plane, means slidable along the base for supporting and moving a clam to be operated upon into splitting engagement with said splitting knives, a guide for positioning a clam to be split with the joint between its shell sections in alinement with said splitting knives, said guide being movable along the splitting knives during a splitting operation, and means for returning said guide to its initial position after a splitting operation.

11. A device for opening clams and similar shell fish comprising a base, splitting knives pivotally mounted upon the base for swinging movement in a horizontal plane, means slidable along the base for supporting and moving a clam to be operated upon into splitting engagement with said splitting knives, a guide embracing said knives and slidable therealong during a splitting operation, and means for effecting a swinging movement of the splitting blades about their pivotal points upon movement of the guide therealong.

12. A device for opening clams and similar shell fish comprising a base, splitting knives pivotally mounted upon the base for swinging movement in a horizontal plane, means slidable along the base for supporting and moving a clam to be operated upon into splitting engagement with said splitting knives, a guide embracing said knives and slidable therealong during a splitting operation, and means for effecting a swinging movement of the splitting blades about their pivotal points upon movement of the guide therealong, said last mentioned means including angularly disposed slots in said splitting blades and pins carried by said guide and extending into said slots.

13. A device for opening clams comprising in combination, a base, splitting knives mounted upon the base, means slidable along the base for supporting and moving a clam to be operated upon into splitting engagement with said splitting knives, and a guide for positioning a clam to be split with the joint between its shell sections in alinement with said splitting knives, said guide being slidable along the splitting knives.

14. A device for opening clams comprising in combination, a base, splitting knives mounted upon the base, means for supporting and moving a clam to be operated upon into splitting engagement with said splitting knives, and a guide for positioning a clam to be split with the joint between its shell sections in alinement with said splitting knives, said guide being moved along the splitting knives by said clam as it is moved relative to the splitting knives.

THOMAS F. LEAHEY.